(12) United States Patent
Gangasharan et al.

(10) Patent No.: US 7,827,152 B1
(45) Date of Patent: Nov. 2, 2010

(54) ASYNCHRONOUS ON-DEMAND SERVICE STARTUP

(75) Inventors: Binod Pankajakshy Gangasharan, Bangalore (IN); Sanjeev Krishnan, Bangalore (IN); Aditya Gore, Bangalore (IN)

(73) Assignee: Oracle America, Inc., Redwood City, CA (US)

( * ) Notice: Subject to any disclaimer, the term of this patent is extended or adjusted under 35 U.S.C. 154(b) by 733 days.

(21) Appl. No.: 11/259,443

(22) Filed: Oct. 26, 2005

(51) Int. Cl.
G06F 7/00 (2006.01)
G06F 17/00 (2006.01)
G06F 15/177 (2006.01)

(52) U.S. Cl. ...................... 707/686; 709/222
(58) Field of Classification Search ................. 707/205, 707/686; 711/170; 709/220, 222
See application file for complete search history.

(56) References Cited

U.S. PATENT DOCUMENTS

| | | | |
|---|---|---|---|
| 5,428,780 A * | 6/1995 | England et al. | 717/142 |
| 5,721,925 A | 2/1998 | Cheng | |
| 6,425,017 B1 | 7/2002 | Dievendorff et al. | |
| 6,631,425 B1 * | 10/2003 | Helland et al. | 719/332 |
| 6,665,724 B2 * | 12/2003 | Lawrence | 709/230 |
| 6,711,657 B1 * | 3/2004 | Sexton et al. | 711/170 |
| 6,725,456 B1 * | 4/2004 | Bruno et al. | 718/102 |
| 6,823,460 B1 * | 11/2004 | Hollander et al. | 726/3 |
| 6,845,503 B1 | 1/2005 | Carlson et al. | |
| 6,859,834 B1 | 2/2005 | Arora et al. | |
| 7,503,052 B2 * | 3/2009 | Castro et al. | 719/328 |
| 2002/0165907 A1 | 11/2002 | Dornquast et al. | |
| 2004/0068560 A1 | 4/2004 | Oulu et al. | |
| 2004/0215762 A1 | 10/2004 | Oulu et al. | |
| 2004/0215768 A1 | 10/2004 | Oulu et al. | |
| 2005/0197819 A1 | 9/2005 | Hopkins. | |

OTHER PUBLICATIONS

Chapter 17—Network-Extensible Applications with Factory Objects, Apr. 29, 2004, pp. 1-13.*
ServerSocket, Apr. 5, 2003, pp. 1-13.*
Mahmoud, Qusay H., Sockets programming in Java: A tutorial, Dec. 11, 1996, Javaworld.com, http://javaworld.com/javaworld/jw-12-1996/jw-12-sockets.html.*
Carter, Richard, Detecting Timed-Out Cliient requests for Avoiding Livelock and Improving Web Server Performance, IEEE, 2000.*
"UNIX System Manager's Manual," Linux Netkit 0.09, Nov. 23, 1996, 2 pages.

* cited by examiner

*Primary Examiner*—Greta L Robinson
*Assistant Examiner*—Jeffrey Chang
(74) *Attorney, Agent, or Firm*—Robert C. Kowert; Meyertons, Hood, Kivlin, Kowert & Goetzel, P.C.

(57) ABSTRACT

An application server may initialize network services asynchronously and/or on-demand. Some services may be initialized during startup of the application server, while initialization of other services may be delayed. The application server may report that the services are initialized before they are actually initialized and may be configured to receive client requests for non-initialized services. When a client request is received, the application server may delay processing the client request either until the requested service is initialized or until all services are initialized. The application server may hold a received client request in a network layer until the requested service, and possibly other services on which the requested service depends, is initialized able to process the client request. Delaying initialization of some application server network services may result in a faster startup or restart time for the application server.

20 Claims, 7 Drawing Sheets

ASYNCHRONOUS ON-DEMAND SERVICE STARTUP

BACKGROUND

1. Field of the Invention

This invention relates to computer systems, and more particularly to the initialization of services in an application server, such as for Java™-based server applications.

2. Description of the Related Art

An application server is generally a program executing on a computer in a distributed application network that provides services for one or more application programs. The application server is frequently viewed as part of a three-tier application, including a user interface tier, an application tier (business logic), and a backend tier (database, transactional systems, legacy systems, etc.). The first tier may provide a Web browser-based interface to the user, usually at a personal computer or workstation. In the middle-tier, the application server may provide numerous services to a business logic application or set of applications, possibly executing on a local area network or intranet computer. An application server may include a web server providing Internet and web-based services. In the third or back-end tier, database and transaction servers, often executing on a mainframe or large computer, provide data needed by the business logic applications.

The application server may provide services that are commonly required by business logic applications. Many of these services may be called as functions from the application code without the need for each application programmer to implement them explicitly within the code. Examples of services made available to applications by an application server may include mail services, transaction services, asynchronous messaging, database connectivity, naming and directory services, and security and authentication services. In general, the more services made available to applications as part of an application server, the easier it may be to implement business logic applications.

However, the startup time of an application server typically increases as more services are added due to the need to initialize each service. For example, network services such as HTTP, IIOP, RMI/JRMP, etc. typically initialize themselves at application server startup and open server sockets to listen for requests from clients. The initialization of these services frequently adds significantly to memory usage and startup time for the application server even though some of these network services may not be used by clients. In applications where high availability is important, it may be beneficial to have a short startup or restart time for application servers.

One way to address this concern might be to customize each service in an application server for delayed initialization. Each individual service might be augmented to include a lazy initialization component to delay initialization of the service until a request is received for the service. This requires customization for each service and increases the complexity of service development and the addition of additional services to the application server.

SUMMARY

Various embodiments of a system and method for asynchronous and on-demand initialization of application server network services are disclosed. In one embodiment, an application server may provide a variety of services to clients, such as applications and/or other services. During startup of the application server, services necessary to the basic function of the application server, including a naming service and/or a socket service, may be initialized during startup, while initialization of other services, e.g. network and/or web services, may be delayed. Delaying initialization of some application server network services may, in some embodiments, result in a faster startup or restart time for the application server. The application server's socket service may include an on-demand service initiator, which may intercept service client requests. When a client request is received the socket service may initialize the required network service. Individual application server network services may not be configured to implement asynchronous or on-demand initialization themselves. Instead, the application server's socket service may implement asynchronous and/or on-demand initialization of application server network services.

In one embodiment, during startup or restart of an application server, the application server's socket service may access information regarding required network service ports and register a selector for each port. Once a selector has been registered for each required network service endpoint or port, the socket service may report that the network services are, or that the application server is, ready to receive client requests even though the individual services may not have been initialized. The socket service may then intercept received client requests and responsively initiate network services based on those requests. The socket service may also delay responses to the received client requests to allow time for the required network services to be initialized. In another embodiment, the application server's socket service may bind a socket for each network service port according to the network service information. The socket service may report that the network services are ready to receive client requests and subsequently initialize the required network services while listening for client requests. Should a client request be received prior to the complete initialization of the required network service(s), the socket service may delay responses to the received client requests to allow time for the required network service(s) to be initialized. Alternatively, in another embodiment, the socket service may initialize the requested service in response to receiving a client request for the service.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
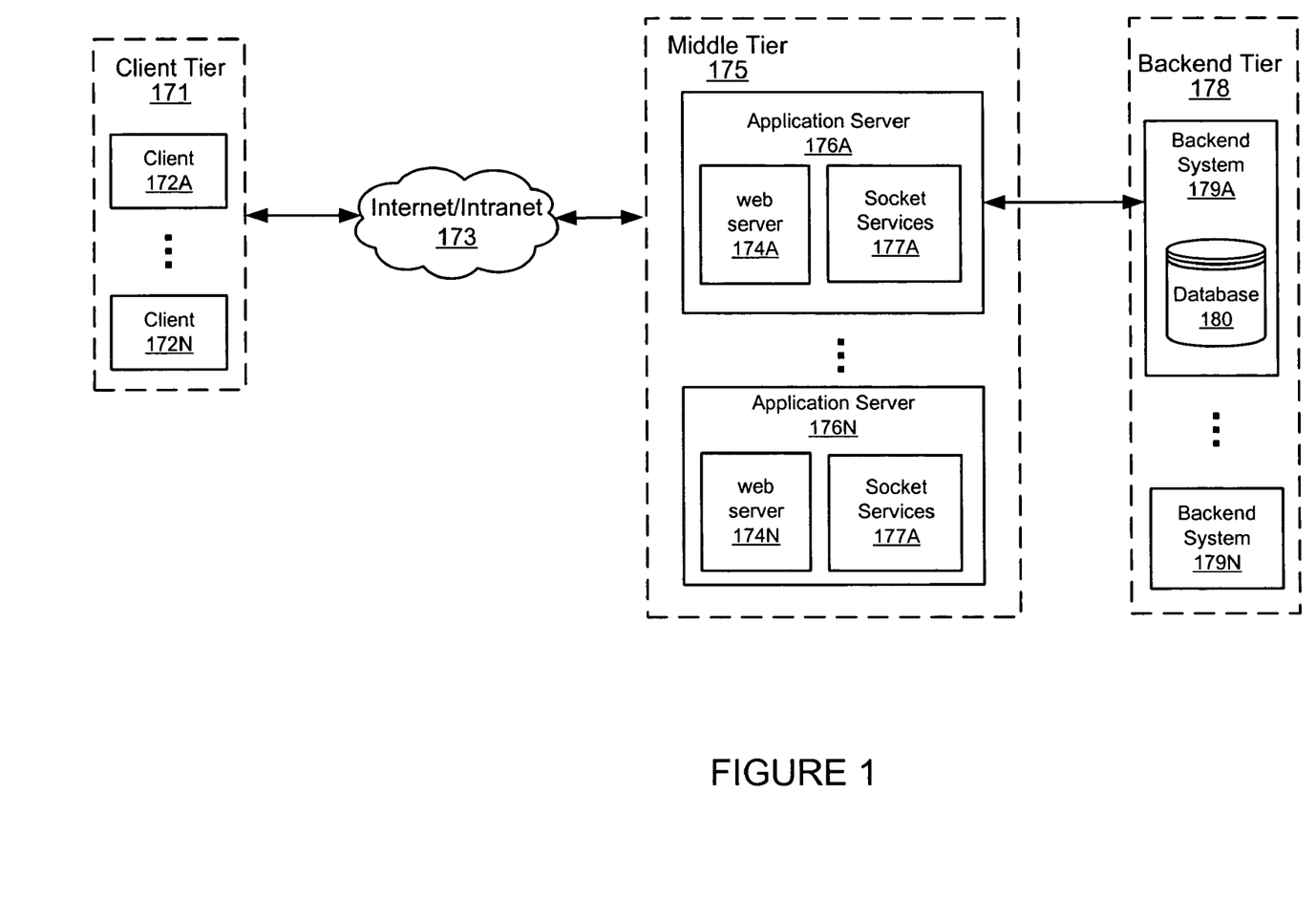
FIG. 1 illustrates a three-tier architecture of a computer system, suitable for implementing various embodiments of asynchronous and on-demand service startup.

FIG. 1 illustrates a three-tier architecture of a computer system, which may be suitable for implementing various embodiments of asynchronous and on-demand service startup. The application logic of the computer system may be divided into application components (e.g., applets, servlets, server pages, beans, application clients, database objects) according to function, and the various application components may be installed on different computers depending on factors such as security and load distribution. Tiers (e.g., client tier 171, middle tier 175, backend tier 178) may represent the logical or physical organization of the application components, which may operate across one or more different computers. The different computers may be based on different platforms and architectures. In one embodiment, the application components of the computer system may be based on a three-tier architecture. In other embodiments, the application components of the computer system may be based on an architecture with a different number of tiers, such as a two-tier or N-tier architecture.

Client tier 171 may include a number of different clients 172A through 172N (e.g., device, system, user interface) communicating to application components (e.g., servlets, server pages, beans) in the middle tier 175 via the Internet/Intranet 173. The middle tier 175 may include a number of different application servers 176A through 176N and/or web servers 174A through 174N. In some embodiments, an application server 176 may include functionality typically provided by a Web server 174. For example, functionality provided by a web server 174 may be included in an application server 176 eliminating the need for the separate web server 174. In other embodiments, however a web server 174 may execute in the middle tier 175 without being a part of an application server, but may communicate and interact with an application server 176, also executing in the middle tier 175. The backend tier 178 may include a number of different computer systems 179A through 179N including data or other resources, such as database 180.

Application components may communicate using different types of protocols and technologies such as HyperText Transfer Protocol Secure sockets (HTTPS), Java™ Database Connectivity (JDBC), and/or Simple Object Access Protocol (SOAP). The application components within a tier typically communicate with remote application components in an adjacent tier. For example, users with access to a client server component configured to operate in client tier 171 (e.g., an application client accessible via a Web browser) may initiate requests to remote application components configured to operate in middle tier 175. Such requests may make use of network services provided by the application server such as HTTP, IIOP, RMI/JRMP, etc. Application components in the middle tier 175 may, in turn, initiate requests to the backend tier 178 to satisfy requests of the client components in the client tier 171. For example, an application component in the client tier 171 (e.g., bean) may receive a remote request from a Web browser operating in the client tier 171 and in response access a backend component (e.g., database object) operating in the backend tier 178. The backend application component operating in the backend tier 178 may then provide a response to the business application component operating in middle tier 175 which may complete the remote request by providing requested information to the client application component operating in the client tier 171.

Application components operating within the middle tier 175 may be configured to utilize services provided by an application server, such as application server 176A. Some standard services, that may, in some embodiments, be provided for applications include: Java servlets, Java Server Pages, Enterprise JavaBeans, RMI-IIOP, Object Request Broker, mail services, transaction services, asynchronous messaging, database connectivity, Java Enterprise Edition Connector Architecture, XML processing, Management Extensions, naming and directory services, and security and authentication services, among others. Network services, such as those mentioned above, may listen to specific ports on the application server. Clients, such as web applications and EJB components, may access the network services provided by the application server via the appropriate ports.

An application server, such as application server 176A may include socket services 177 that may, in some embodiments, implement asynchronous and on-demand service startup, as described herein. In some embodiments, application server 176A may also implement asynchronous and on-demand service startup for a web server, such as web server 174A. In general, when described herein, a web server may be considered a socket services for the purposes of asynchronous and on-demand service startup, according to some embodiments. As mentioned above, an application server, such as application server 176A may delay initialization of some or all network services, possibly including a web server service, until after other portions of the application server have been initialized. For instance, in one embodiment, an individual network service may not be initialized until a client request is received for that service. Similarly, the application server may delay initialization of network services until after the application server is otherwise initialized and may then initialize each network service in turn, asynchronously in the background, until all network services are initialized, according to another embodiment. If a client request for a network service is received before all the network services are initialized, the application server may, according to certain embodiments, delay responses to the received client requests (or alternatively, may cause the client requests to be resent, such as due to a time out condition), until the network services are initialized. In one embodiment, the application server may delay responses to received client requests until all network services are initialized, while in another embodiment, the application server may delay responses to client requests only until the requested services (and any other services required by the requested service) is initialized.

According to one embodiment of the asynchronous and on-demand service startup, when the application server is started or restarted, such as by executing a startup command, socket service selectors may be started for servicing client requests. After configuring socket service selectors for each network service, the application server startup command may exit, possibly providing an indication that the application server is ready to receive network services requests, even though the network services may not actually be initialized. For example, one embodiment of the application server may display a message indicating that the application server is ready to receive client requests. Application server startup, such as initializing individual network services, may continue in the background until all services have been initialized. As noted above, if a client request is received by the application server prior the completion of background startup of network services, then that client may not receive a response until the application server has actually completed initialization of all services. Alternatively, as noted above, the application server may initialize the particular requested network service and thus, a client may only have to wait to receive a response until its requested service is initialized, rather than waiting until all services are initialized, according to one embodiment.

Figure 2:
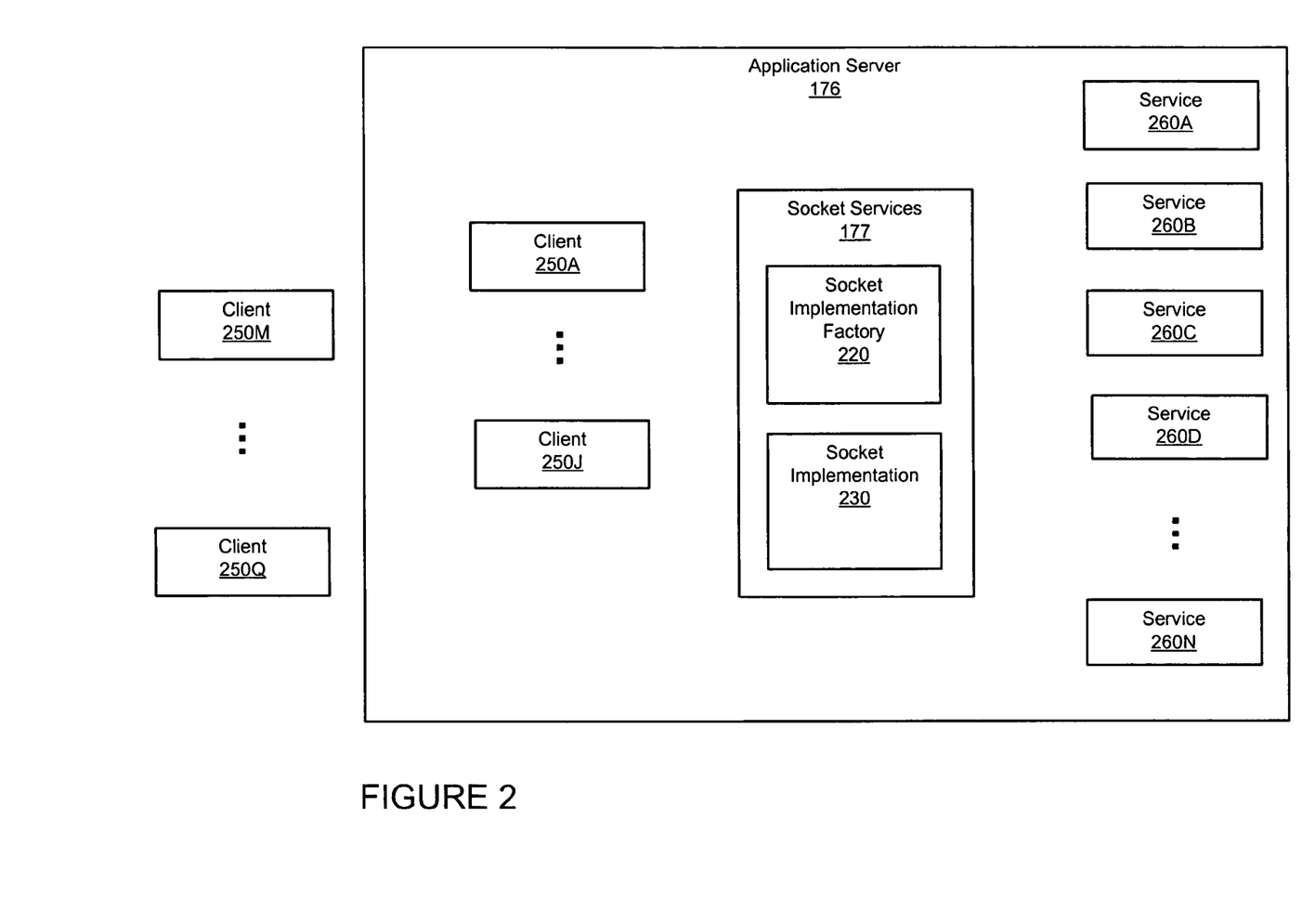
FIG. 2 illustrates the components of an application server implementing asynchronous and on-demand service startup, according to one embodiment.

FIG. 2 illustrates, according to one embodiment, various components of an application server 176. Application server 176 may include socket services 177 along with various services 260 (e.g. services 260A-260N), such as Java servlets, Java Server Pages, Enterprise JavaBeans, RMI-IIOP, Object Request Broker, mail services, transaction services, asynchronous messaging, database connectivity, Enterprise Connector Architecture, XML processing, Management Extensions, naming and directory services, and security and authentication services, among others. One or more of services 260 may use socket listeners, such as java.net.ServerSocket. In one embodiment, socket services 177 may override (or wrap) a default server socket implementation, such as provided by the JVM, using custom versions of socket implementation factory 220 and socket implementation 230. When Socket Services 177 is invoked, a socket channel may be bound to the listening port of each service. Additionally, one or more socket selectors may be registered to the socket channel to accept connections from clients desiring use of the service. Thus, an application server implementing asynchronous and/or on-demand service startup, as described herein, may include custom socket service, channel and/or selector implementations that override (or are wrappers of) default or internal versions, such as may be provided by the JVM. By using customs versions of socket services, channels and selectors, an application server may be configured to receive client requests before the actual services have been initialized.

Figure 3:
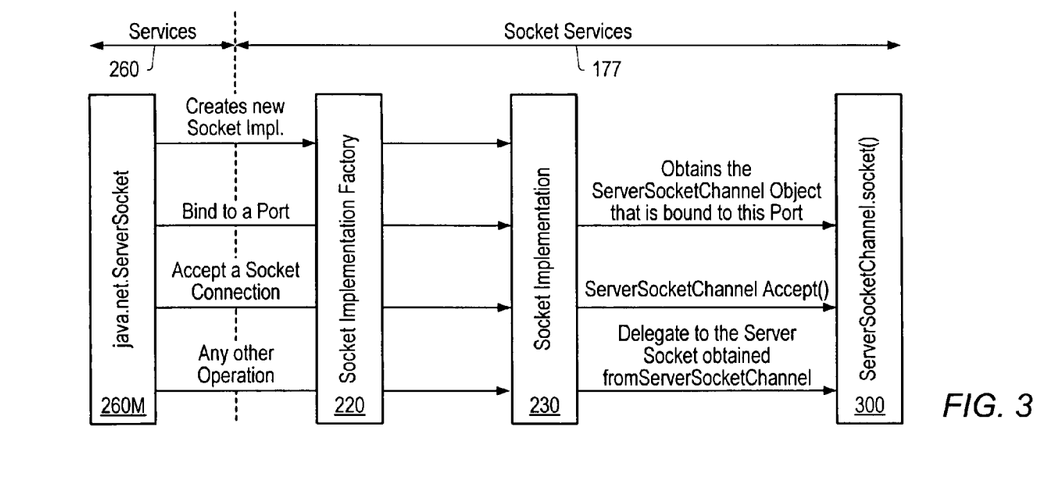
FIG. 3 illustrates the startup/initialization of a network service in an application server utilizing a socket implementation factory implementation, according to one embodiment.

FIG. 3 illustrates, according to one embodiment, the startup/initialization of a network service in an application server, such as application server 176, utilizing a socket implementation factory implementation. Socket Services 177 may set socket implementation factory 220 to act as the factory for socket implementations, as is understood in the art. When a service starts up, it may create a server socket object, such as java.net.ServerSocket 260M, and in the process, the server socket may use the socket implementation factory 220 to create a socket implementation, such as socket implementation 230. A socket implementation created by socket implementation factory 220 may form a wrapper above a server socket channel. Thus, when the service binds the server socket to a port, the socket implementation 230 of that server socket may be populated with the server socket channel previously bound by socket services 177 during the initial phase of the startup of the application server, as described above. Subsequently, when a first client request for the service is issued, it may be received by socket implementation 230 of socket services 177. As described above, socket services 177 may ensure that the client request is held until the application server completes initialization of all network services, according to one embodiment. In an alternative embodiment in which network services may be initialized on-demand, socket services 177 may hold the request until the required service and any other services necessary to the required service have been initialized.

As illustrated in FIG. 3, a server socket created by a service, such as java.net.ServerSocket 260M, may communicate, such as via function calls, with the socket implementation factory 220 in order to create a new socket implementation, such as socket implementation 230. Additionally, the server socket may utilize socket implementation factory 220 to bind a socket channel to a port or to accept a socket connection among other operations, according to some embodiments. For instance, after creating a new socket implementation, as described above, the server socket 260M may bind a channel to a port through socket implementation factory 220 and in turn socket implementation factory 220 may populate the server socket with the server socket channel already bound to that port by socket services 177 during the initial phase of application server startup. As note above, when the first client request for the service is received by the socket implementation 230, socket implementation 230 may make sure that the request is held until the application server completes initialization of either the required network service or of all network services.

Figure 4:
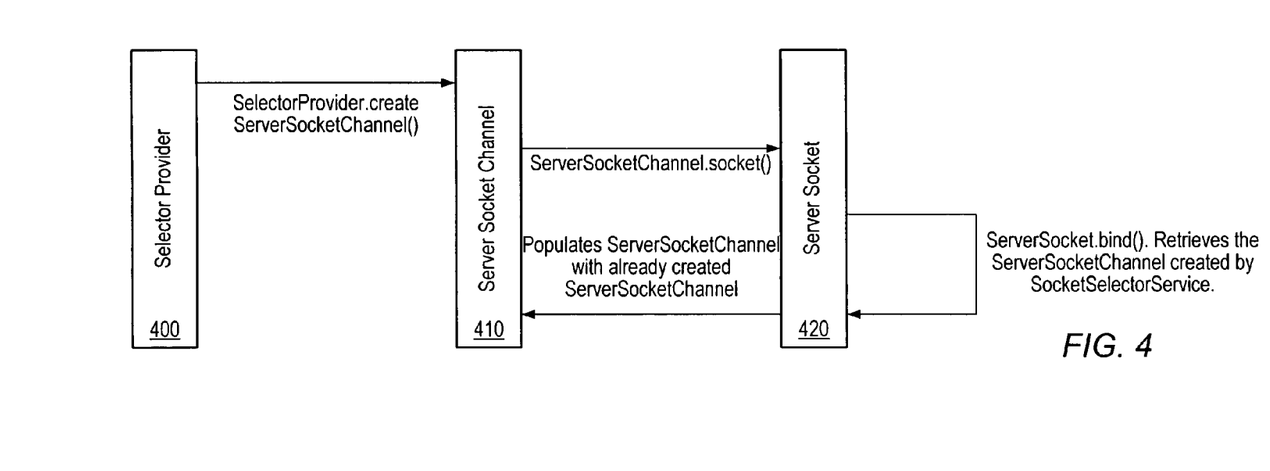
FIG. 4 illustrates the startup/initialization of a network service in an application server utilizing a selector provider implementation, according to one embodiment.

FIG. 4 illustrates the startup/initialization of a network service utilizing a selector provider implementation, according to some embodiments. A new selector provider implementation, such as selector provider 400, may be achieved, in some embodiments, by providing a custom wrapper for a default selector provider. For instance, a custom selector provider may wrap the default sun.nio.ch.DevPollSelectorProvider from the Java Development Kit, according to one embodiment. In some embodiments, selector provider 400 may start (or initialize) selectors on ports. When a service instantiates a server socket channel from the selector provider 400, selector provider 400 may return a server socket channel wrapper, such as server socket channel 410, according to one embodiment. In addition, the server socket implementation returned by the server socket channel, such as via a socket( ) method call, may in some embodiments be a wrapper server socket wrapping the actual server socket returned by the server socket channel. For example, an Object Request Broker (ORB) may bind a server socket to its port and the underlying wrapper, such as server socket 420, may be populated with the server socket channel previously created during the initial phase of application server startup.

In some embodiments, as noted above, an application server may implement on-demand initialization of network services. In such embodiments, further initialization for network services may be postponed until a specific service is requested, thus conserving application server resources as well as reducing startup time. In some embodiments, provision may be made to prevent the generation of exceptions and/or errors. For example, the time required to initialize a service 260 may vary from service to service. When a client submits a service request there may be a timeout period associated with this request within which the client expects to receive the requested object. Should the requested object not be returned within this length of time, the client may generate an error message. In one embodiment, the new socket service provider may include, or be configured to access, information on request timeout periods as well as initialization times for required services. When a client issues a request for a previously un-initialized service, socket services 177 may compare the timeout period for the request with the initialization time for the requested service. If the initialization time for the requested service is longer than the timeout period, socket services 177 may initiate the initialization of the requested service and, prior to the expiration of the timeout period, return a response to the requesting client that causes the client to re-submit the service request. For services with long initialization periods, this exchange of messages may occur several times during the period in which the requested service 260 is being initialized. Additionally, the number of such message exchanges may vary from service to service as the time required to initialize services may also vary from service to service. In this way the socket service provider may circumvent the generation of errors or exceptions. Once the requested service 260 is available, the service may then correctly respond to the client request, such as by returning a corresponding service object to the requesting client.

Figure 5A:
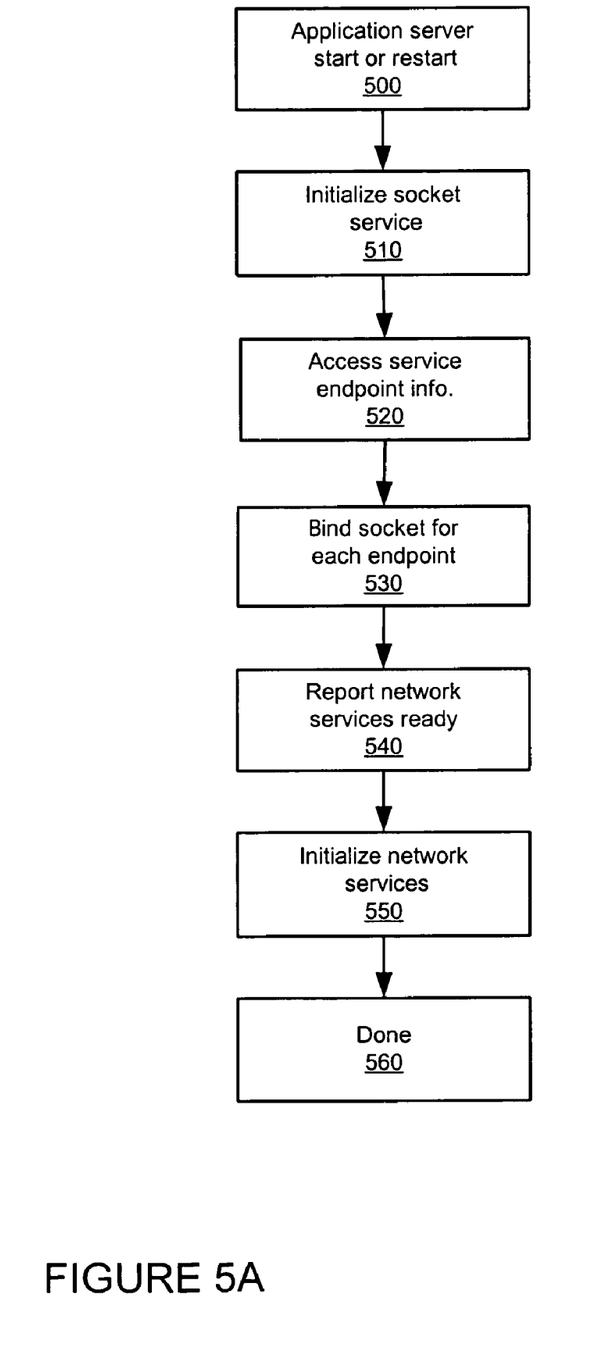
FIG. 5A is a flowchart of a method for initializing network services in an application server implementing asynchronous service startup, according to one embodiment.

FIG. 5A is a flowchart illustrating one embodiment of a method for initializing network services in an application server implementing asynchronous service startup. At 500, an application server may be started or restarted and during the startup process, services that are essential to the basic function of the application server, such as naming services, may be initialized while other services, such as network services, may be only partially initialized. As noted above, network services may not actually be initialized, but the necessary socket selectors, channels, and ports may be configured so that the application server may receive client requests for non-initialized network services. Postponing the complete initialization of some application server services (including network services) may reduce the amount of time required for application server startup, in some embodiments.

At block 510, the application server's socket services may be initialized. Socket services, such as socket services 177, may interpose between the network layer (such as the TCP/IP network layer) and the network services in the application server and may provide for delayed network service initialization without requiring any modifications to the individual network services themselves. As part of its initialization, socket services 177 may access information on network service endpoints (e.g. ports), as illustrated in block 520. For example, in one embodiment, information regarding network service endpoints may be read from a configuration file, such as from an XML file defining specific ports and their use. At block 530, the socket services 177 may bind server sockets for each port so that the server can receive client requests even through the requested network services may not be initialized when the client requests are received. Note that while the network services may not be initialized when a client request is received, the socket services 177 may indicate that they are ready to receive client requests for the network services, as indicated in block 540. In other words, socket services 177 may indicate that the application server is ready to receive requests for network services even though the network service may not have been initialized.

In embodiments implementing asynchronous startup of network services after reporting that network services are ready to receive requests, socket services 177 may proceed to initialize the remaining portions of the individual network services in the background, as shown in block 550. As long as there are network services left to initialize the socket service may continue this background task until all required network services are active, and then complete the initialization task, as shown in block 560. Socket services 177 may initialize network services asynchronously, in the background, in any suitable order or manner. In one embodiment, socket services 177 may simply initialize each network service in order, while in other embodiments, socket services 177 may ensure that any other services required by a network service are initialized prior to initializing that particular network service. As noted above, if a client request is received before all the network services are initialized, the application server, or the socket services on the application server, may hold the received client request until all network services are initialized. In other embodiments, however, the client request may only be held until the requested service (and any other services required by the requested service) is initialized. According to one embodiment, the socket services may initialize a requested service before initializing other services that otherwise may have been other initiated before the requested service (if a client request had not been received for the requested service).

Figure 5B:
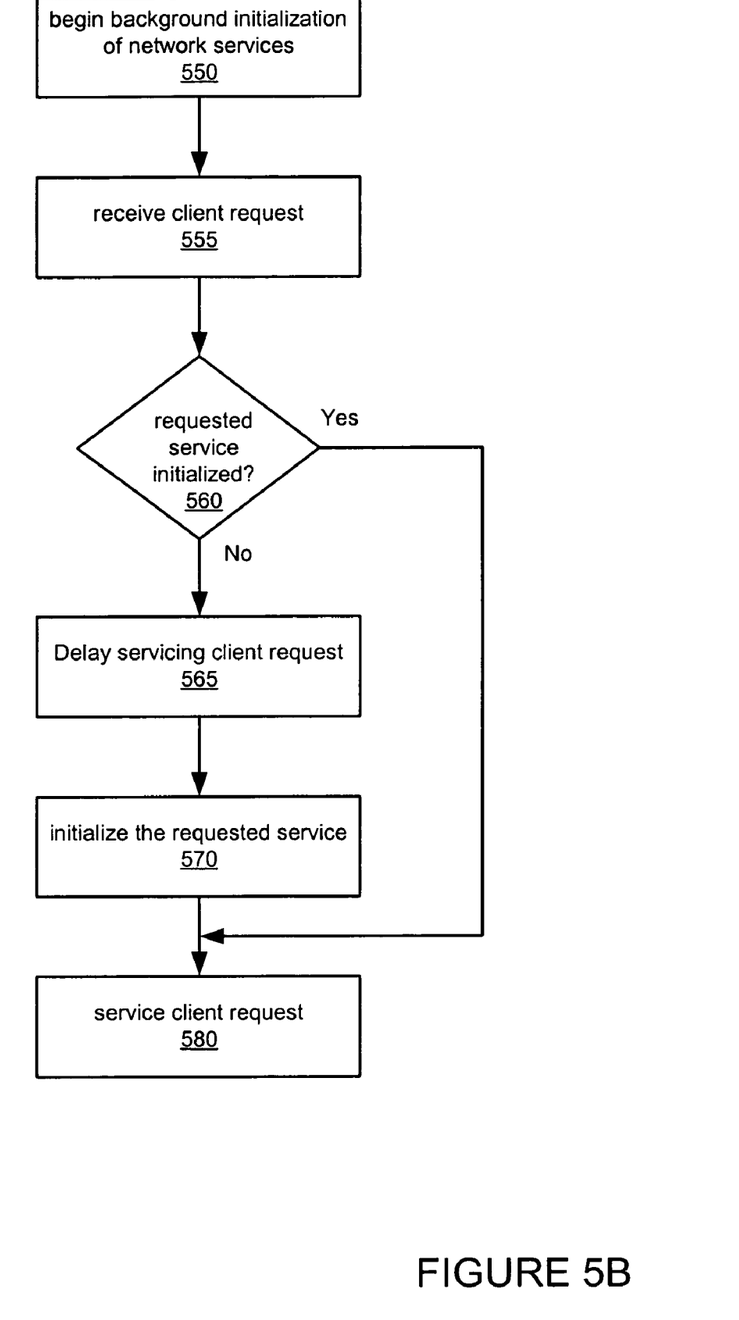
FIG. 5B is a flowchart of a one embodiment of a method for reception of client requests prior to completion of network service initialization.

As noted above, as part of asynchronous and on-demand service startup, an application server, such as application server 176 may be configured to receive client requests for network services before those network services are initialized. FIG. 5B is a flowchart illustrating one embodiment of a method for processing client requests during asynchronous and on-demand service startup. As described previously, a network service may, during initialization, bind a server socket to an appropriate port and the service may be given a socket channel (or socket channel wrapper) that was created by the application server's socket services during application server initialization. After configuring socket services, channels, ports, and selectors, an application server, such as application server 176, or the socket services 177 of application server 176, may begin background initialization of network services, according to one embodiment. In other embodiments, the application server and/or socket services may wait until receiving a client request for a specific network service before actually initializing any network services. The application server 176 may receive a client request while socket services 177 is still asynchronously completing the background initialization of network services, as illustrated by block 555. If, as indicated by the positive output from decision block 560, the requested service (and any other services required by the requested service) is already initialized, the application server (and/or the requested service) may service the received client request, as indicated by block 580. For example, in one embodiment, the application server may return a service object to the client.

If, however, the requested service has not been initialized, as indicated by the negative output from decision block 560, the application server may delay servicing the client request, as illustrated by block 565. For instance, in some embodiments, the client request may be held in the TCP/IP network layer until the appropriate network service has completed initialization (and has issued an accept( ) call, according to one embodiment). In other embodiments, the application server may send a response to the requesting client that causes the requesting client to resend the original request message (or to reattempt to bind to the requested service's port). In some embodiments, causing the client to resubmit a request (possibly multiple times) may prevent the client from generating errors or exceptions because the network service is not initialized. As noted above, in one embodiment, the application server may cause a requesting client to resend a request multiple times until the requested service is ready to service the client request.

Alternatively, in other embodiments, even if a requested service has been initialized, the application server may not service a client request for that service until all other services of the application server have also been initialized. Thus, in some embodiments, rather than determining at block 560 whether or not the requested service is initialized, the application server may determine whether or not all services have been initialized.

After receiving a client request for a requested service and after delaying the servicing of the request, such as by holding the request in the network layer or by causing the client to resend the request, the socket services may initialize the requested service, as illustrated by block 570. As described above, in some embodiments, an application server may delay servicing a client request until all network services have been initialized, while in other embodiments, a client request may be serviced after the requested service (and possibly any other services required by the requested service) has been initialized, even though yet other services may not have been initialized. After initializing the requested service (and possibly after initializing all services) the application server and/or the requested service may service the client request, as illustrated by block 580.

Figure 6:
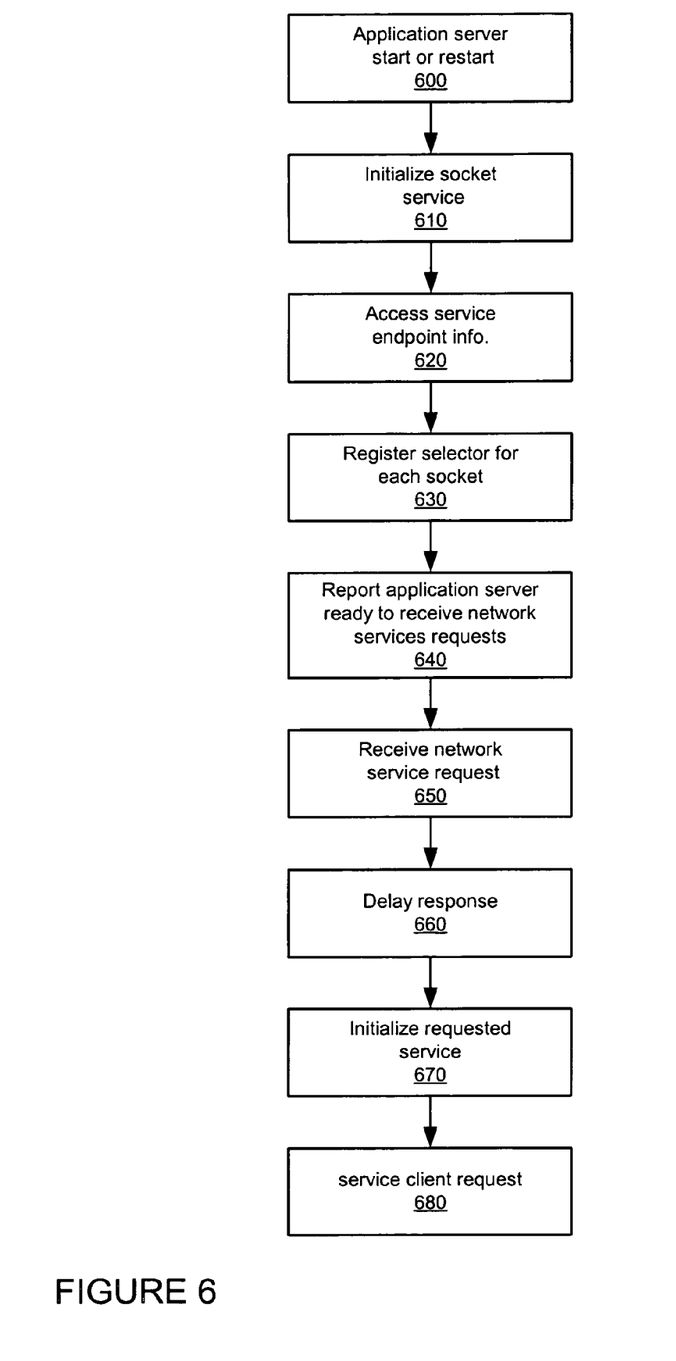
FIG. 6 is a flowchart of a method for initializing network services in an application server implementing on-demand startup, according to one embodiment.

While FIGS. 5A and 5B mainly involved asynchronous startup of services, FIG. 6 is a flowchart illustrating one embodiment of a method for on-demand initialization of network services in an application server. In embodiments implementing on-demand startup of network services, the initialization of each network service may be delayed until a client request for that particular service is received. For instance, at block 600, an application server may be started or restarted. As described above regarding FIG. 5, during the startup process, services that are essential to the basic function of the application server, such as naming services, may be initialized. As described above, other services, such as network services, may not be initialized or may be only partially initialized. As in the case for asynchronous startup described in regard to FIGS. 5A and 5B, during application server startup, socket services, such as socket services 177, may be initialized and may access information on the network endpoints (ports) required by the application server. In one embodiment, socket services 177 may register a selector for each server socket, as illustrated by block 630, so that socket services 177 may be informed of incoming client requests.

After initializing and configuring socket services, channels, and selectors, application server 176 and/or socket services 177 may report or otherwise indicate that the application server is ready to receive requests for network services, even through in actuality the network services may not have been started or initialized, as indicated by block 640.

As depicted in block 650, upon receiving a request from a client, such as client 172A, socket services 177 may delay the response to the request, as shown in block 660, and may initialize the appropriate network service corresponding to the port on which the request was received, as indicated in block 670. As noted above, socket services 177 may also initialize other services required by the requested network service, according to one embodiment. During the initialization of the requested service, the service may bind a server socket to the appropriate port, and socket services 177 may provide the service with the socket channel object, which socket services 177 may have created for this port at application server startup. The network service may then complete its initialization (and possibly issue an accept ( ) call) and process the client request in a normal fashion, as shown in block 680.

Figure 7:
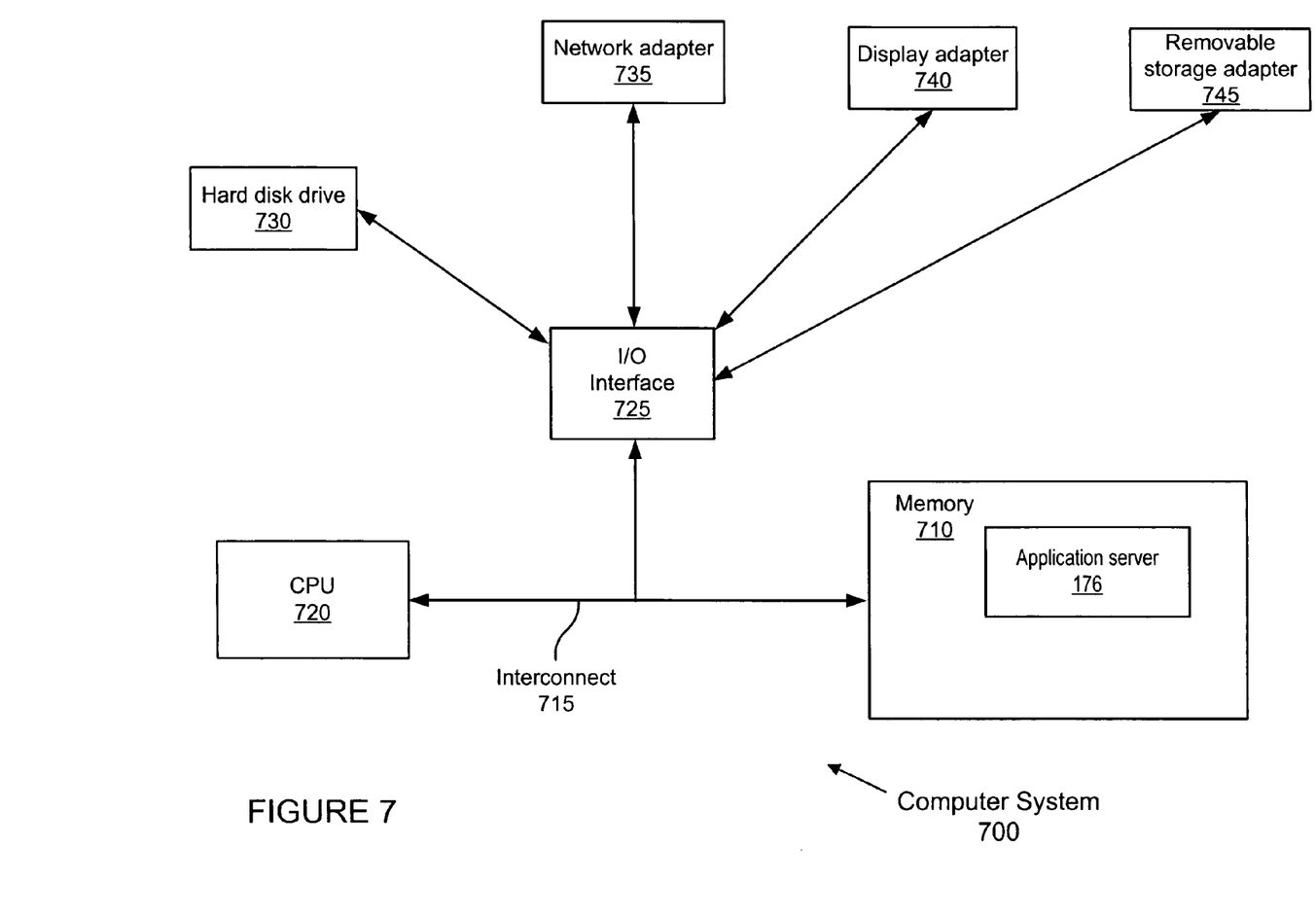
FIG. 7 illustrates an exemplary computer system that may include an application server as described herein, according to one embodiment.

FIG. 7 illustrates one embodiment of a computer system 700 that may be capable of implementing asynchronous and on-demand service startup, as described herein. Computer system 700 may be or include an application server, such as application server 176 configured to implement asynchronous and on-demand service startup, as described herein.

Computer system 700 may include many different components such as memory 710, a central processing unit (CPU) or processor 720, and an input/output (I/O) interface 725. Interconnect 715 may be relied upon to communicate data from one component to another. For example, interconnect 715 may be a point-to-point interconnect, a shared bus, a combination of point-to-point interconnects and one or more buses, and/or a bus hierarchy including a system bus, CPU bus, memory bus and I/O buses such as a peripheral component interconnect (PCI) bus.

The computer system 700 preferably includes a memory medium on which computer programs according to various embodiments may be stored. The term "memory medium may include an installation medium, e.g., a CD-ROM, or floppy disk; a computer system memory such as DRAM, SRAM, EDO DRAM, SDRAM, DDR SDRAM, Rambus RAM, etc., or a non-volatile memory such as a magnetic media, e.g., a hard drive 730, or optical storage. The memory medium may include other types of memory as well, or combinations thereof. In addition, the memory medium may be located in a first computer in which the programs are executed, or may be located in a second, different computer, which connects to the first computer over a network. In the latter instance, the second computer may provide the program instructions to the first computer for execution.

Also, the computer system 700 may take various forms, including a personal computer system, mainframe computer system, workstation, network appliance, Internet appliance, personal digital assistant (PDA), television system or other device. In general, the term "computer system" can be broadly defined to encompass any device having a processor, which executes instructions from a memory medium. The memory medium preferably stores a software program or programs for event-triggered transaction processing as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired.

Memory 710 may store program instructions accessed by the CPU 720. For example, in some embodiments, memory 710 may include instructions and data implementing asynchronous and on-demand service startup, as described herein. Additionally, memory 710 may include program instructions configured to implement an application server, such as application server 176, according to some embodiments. As described above, an application server, such as application server 176, may implement asynchronous and on-demand service startup, as described herein.

Computer system 700 may further include other software and hardware components, such as an input/output (I/O) interface 725, that may be coupled to various other components and memory 710. The CPU 720 may acquire instructions and/or data through the I/O interface 725. Through the I/O interface 725, the CPU 720 may also be coupled to one or more I/O components. As illustrated, I/O components may include a hard disk drive 730, a network adapter 735, a display adapter 740 and/or a removable storage adapter 745. Some components 730 to 745 may be coupled to the I/O interface 725. In addition, the computer system 700 may include one or more of a particular type of component. The computer system 700 may include one or more components coupled to the system through a component other than the I/O interface 725. Some computer systems may include additional and/or other components such as application software (e.g., stored in memory 710), other CPUs, video monitors or other displays, track balls, mice, keyboards, printers, plotters, scanners, or other types of I/O devices for use with computer system 700.

Various embodiments may further include receiving, sending or storing instructions and/or data implemented in accordance with the foregoing description upon a computer accessible or computer readable medium. Generally speaking, a computer accessible or computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc.

Please note that the flow charts described herein represent exemplary embodiments of methods. The methods may be implemented in software, hardware, or a combination thereof. Additionally, the order of method may be changed, and various method steps and/or elements may be added, reordered, combined, omitted, modified, etc., according to various embodiments.

Various modifications and changes may be made to the invention as would be obvious to a person skilled in the art having the benefit of this disclosure. For example, while asynchronous and on-demand service startup is described herein mainly in reference to an application server, asynchronous and on-demand service startup may be provided for, or implemented by, any of various types of servers. It is intended that the following claims be interpreted to embrace all such modifications and changes and, accordingly, the specifications and drawings are to be regarded in an illustrative rather than a restrictive sense.

What is claimed is:

1. A system, comprising:
 a processor; and
 a memory coupled to the processor, wherein the memory comprises program instructions executable by the processor to implement:
  an application server comprising a plurality of network services, wherein each network service is configured to provide a respective service after being initialized, wherein to provide its respective service, each network service is configured to:
   listen on one or more respective network ports of the application server for requests from one or more clients for service provided by the network service; and
   service the requests for service received on the one or more respective network ports;
  wherein the application server is configured to startup without initializing the plurality of network services; and
  a socket service distinct from the plurality of network services, the socket service configured to:
   startup prior to initialization of the plurality of network services;
   intercept a client request on the one or more respective network ports for service from one of the plurality of network services that is not yet initialized; and
   in response to said intercepting the client request for service, initialize the requested one of the plurality of network services.

2. The system as recited in claim 1, wherein the socket service is initialized during startup of the application server.

3. The system as recited in claim 1, wherein the socket service is further configured to indicate that the application server is ready to receive requests for the network services regardless of whether or not the network servers were initialized.

4. The system as recited in claim 3, wherein prior to indicating that the application server is ready to receive requests for the network services, the socket service is configured to access network service port information regarding a plurality of network service ports associated with the plurality of network services.

5. The system as recited in claim 4, wherein the socket service is further configured to register a selector for each network service port according to the network service port information.

6. The system as recited in claim 1, wherein in response to receiving the client request the socket service is further configured to delay a response to a client that sent the client request until the requested network service is initialized.

7. The system as recited in claim 1, wherein in response to receiving the client request, the socket service is further configured to send a response to a client that sent the client request, wherein the response is configured to cause the client to resend the client request.

8. The system as recited in claim 1, wherein after having been initialized the requested network service is configured to process the client request.

9. The system as recited in claim 1, wherein to initialize the requested network service the socket service is further configured to initialize all of the plurality of network services.

10. The system as recited in claim 1, wherein the socket service is further configured to initialize the plurality of network services as an asynchronous background process prior to receiving the client request.

11. The system as recited in claim 1, wherein the socket service is further configured to initialize one or more others of the plurality of network services required by the requested network service.

12. A method, comprising:
 initializing an application server without initializing one or more of a plurality of network services of the application server, wherein initializing the application server comprises initializing a socket service, wherein the socket service is distinct from the plurality of network services;
 wherein once initialized, each network service listens on one or more respective network ports of the application server for requests for service from one or more clients and services the requests;
 receiving a client request for one of the network services, wherein said receiving is performed by said socket service intercepting the client request on one of the specific network ports when the corresponding network service is not yet initialized; and
 in response to receiving the client request, initializing the requested network service, wherein said initializing the requested network service is caused by the socket service.

13. The method of claim 12, further comprising indicating that the application server is ready to receive requests for the network services regardless of whether the network services were initialized.

14. The method of claim 13, wherein the socket service performs said indicating, said receiving, and said initializing the requested network service.

15. The method of claim 14, further comprising:
 the socket service accessing network service port information regarding a plurality of network service ports associated with the plurality of network services prior to said indicating that the application server is ready receive requests for the network services; and the socket service registering a selector for each network service port according to the network service port information.

16. The method of claim 12, further comprising, in response to said receiving a client request, delaying a response to a client that sent the client request until the requested network service is initialized.

17. The method of claim 12, further comprising, in response to receiving the client request, sending a response to a client that sent the client request, wherein the response is configured to cause the client to resend the client request.

18. The method of claim 12, further comprising: initiating initialization the plurality of network services as asynchronous background process prior to receiving the client request.

19. The method of claim 12, further comprising: initializing one or more others of the plurality of network services required by the requested network service.

20. A computer accessible medium, comprising program instructions executable to implement:

initializing an application server without initializing one or more of a plurality of network services of the application server, wherein initializing the application server comprises initializing a socket service, wherein the socket service is distinct from the plurality of network services;

wherein once initialized, each network service listens on one or more respective network ports of the application server for requests for service from one or more clients and services the requests;

receiving a client request for one of the network services, wherein said receiving is performed by said socket service intercepting the client request on one of the specific network ports when the corresponding network service is not yet initialized; and in response to receiving the client request, initializing the requested network service, wherein said initializing the requested network service is caused by the socket service.

* * * * *